G. F. BALLOU.
CHUCK AND CENTERER.

No. 171,082.                    Patented Dec. 14, 1875.

Witnesses.
E. A. Marsh
M. Wilde

Inventor.
George F. Ballou.

UNITED STATES PATENT OFFICE.

GEORGE F. BALLOU, OF BOSTON, ASSIGNOR TO HENRY N. FISHER AND JOHN E. WHITCOMB, OF WALTHAM, MASSACHUSETTS.

IMPROVEMENT IN CHUCKS AND CENTERERS.

Specification forming part of Letters Patent No. 171,082, dated December 14, 1875; application filed September 29, 1875.

*To all whom it may concern:*

Be it known that I, GEORGE F. BALLOU, of Boston, State of Massachusetts, have invented the Universal Chuck and Spindle, of which the following is a specification:

The object of my invention is to produce a spindle for lathes, for most exact work, as used by watchmakers, jewelers, &c., which not only preserves the center perfectly true, but where the latter can be drawn in without stopping the lathe, and held in by an arrangement of parts, which is entirely inclosed within the spindle, and thus protected from dust and chips; and, further, to produce a universal chuck, consisting of two or more clamps attached to a face-plate, and which not only hold the work in a better, safer, and more substantial manner, but are brought upon the work without defacing or scratching the same; and my invention consists in a hollow spindle, provided with a tapering bushing and straight-pump-center; second, in a jointed pump-center, with an arrangement of drawing it in and holding it in place without weakening the spindle; and, thirdly, in the universal chuck, by constructing the clamps constituting the same stronger, more effective, and their tightening and adjusting screws in such a manner that the upper jaw only is required to swing over the work, when the latter is secured to the face-plate.

Figure 1:
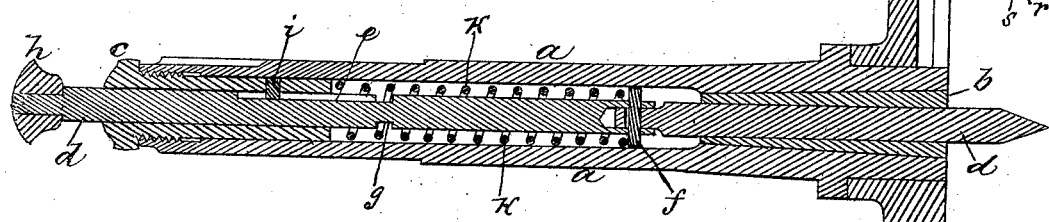
Figure 2:
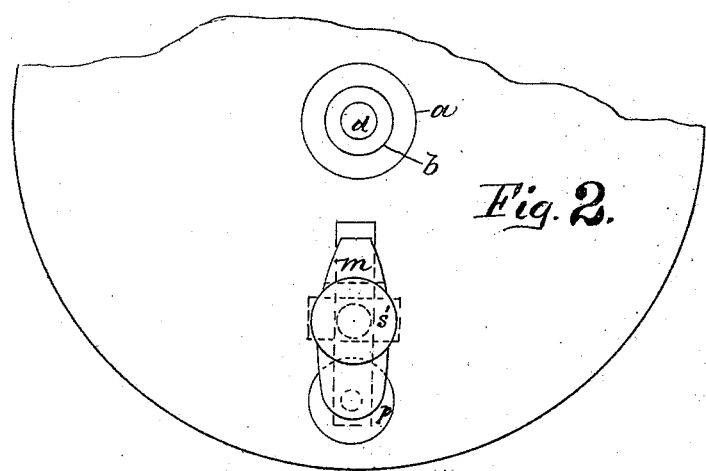

Referring to the drawings, Figure 1 represents a longitudinal section of the spindle and universal chuck. Fig. 2 is a partial elevation of the face-plate with one clamp attached.

$a$ is the hollow spindle, in the front end of which the tapering bushing $b$ is accurately fitted. The rear end is provided with the screw-nut $c$, a portion of which enters the spindle. Through the bushing $b$ a hole is drilled, ground, and leaded perfectly true and straight, and concentric with the tapering portion of it, for receiving the pump-center $d$. The latter consists of two parts, one of which passes through the bushing $b$, the other through the nut $c$. They are joined together by means of a socket and the pin $f$, which is loosely fitted in one of the parts, in such a manner that this joint operates like a ball joint allowing the front portion of pump-center to swivel about the pin $f$. The rear portion of pump-center $d$ is provided with a groove, $e$, terminating in the annular groove $g$ and knob $h$. The screw or pin $i$, in nut $c$, projects into the groove $e$; thus, by pulling back knob $h$, the pump-center $d$ is drawn back until the annular groove meets the pin $i$; then, by giving the pump-center a half-turn, it is held in place by the pin $i$. By turning again until the pin $i$ comes opposite the groove $e$, the spring $k$, which is confined within the spindle and around the pump-rod between the nut $c$ and the pin $f$ of the joint, forces the pump-center forward. Thus it does appear that all the parts operating the pump-center are entirely inclosed within the spindle and protected from dust and chips; that the well-fitted front part of pump-center will retain its center always true; that it will move easy in the bushing, and, by means of the joint, be not effected by any binding or cramping of the other part; and that the spindle will retain its full strength, and not be weakened by cutting out and grooving, as done in the old way.

The universal chuck consists of two or more clamps, $m\ m$, each of which has an upper jaw, $n$, and a lower one, $n'$, and is secured from the front of the face-plate by the head-screw $o$, which passes through both jaws and the face-plate, or into a groove of the latter. The head-screw $o$ consists of a cylindrical nut, $s$, with milled head $s'$, and the screw $t$, whose head is fitted either into a T-shaped groove of the face-plate, or abuts against the back of the same. The two jaws $n\ n'$ are counter-drilled for receiving the spiral spring $r$ around nut $s$, and which forces the jaw apart.

The tightening-screw $p$ is screwed into the lower jaw, having its milled head between the jaws, and the upper portion is either provided with a pointed end, or a small pivot, which is fitted into a step of the upper jaw.

Thus it appears that, in fastening the work in the jaws, the head-screw $o$ only is to be loosened until the upper jaw clears itself from the pivot of the tightening-screw, and may be swung around, in order to place the work directly upon the lower jaw, after which the upper jaw is swung back again and tightened to the work.

The improvement in this clamp consists in moving the upper jaw independently from the lower, which cannot be done with those now in use, where both jaws have to be moved together, when putting the work on, and thus exposing it to injuries by defacing.

What I claim as my invention is—

1. The spindle $a$, in combination with bushing $b$, nut $c$, jointed pump-center $d$, longitudinal groove $e$, annular groove $g$, pin $i$, and spring $k$, substantially as above described.

2. The revolving spindle $a$, in combination with inclosed tapering bushing $b$, and straight and jointed pump-center $d$, in the manner and for the purpose substantially as above set forth.

3. The pump-center $d\ d$, constructed in two pieces, and joined together by a socket or ball joint, in combination with the drawing-back arrangement and knob $h$.

4. The clamp of universal chuck, consisting of two jaws, $n\ n'$, head-screw $o$, with spring $r$ and corresponding recesses for the same, and tightening-screw $p$, with the milled heads in front of the face-plate, the upper jaw to swing independently from the lower jaw $n'$, for the purpose and in the manner above set forth.

5. The universal chuck, consisting of the clamps $m\ m$, in combination with face-plate, spindle $a$, bushing $b$, pump-center $d$, nut $c$, substantially as above described.

GEORGE F. BALLOU.

Witnesses:
E. A. MARSH,
M. WILDE.